Patented Sept. 18, 1951

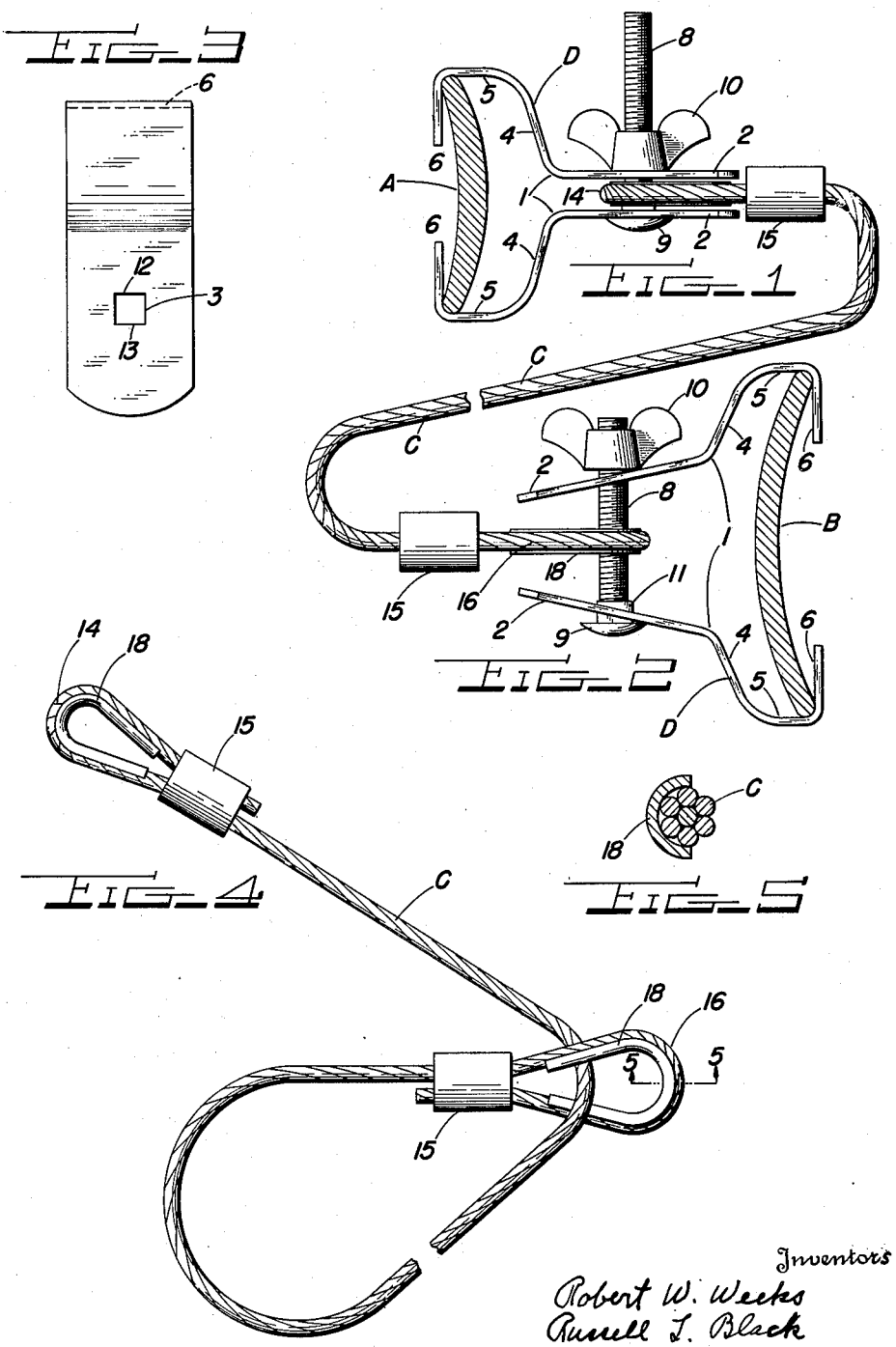

2,568,425

UNITED STATES PATENT OFFICE 2,568,425

TOWING DEVICE

Robert W. Weeks and Russell L. Black, West Chester, Pa.; said Black assignor to said Weeks Application June 5, 1946, Serial No. 674,580

4 Claims. (Cl. 280—33.44)

This invention relates to towing devices particularly adapted for use in coupling together two vehicles so that one may be towed by the other.

The primary objects of the invention are to provide such a device which is of simple, efficient and relatively cheap construction, which may be easily and quickly applied and removed from operative engagement with vehicle bumpers or structural elements of varying sizes, and which may be compactly stored when not in use.

Other more specific objects are: to provide in such a device a bumper clamp or attaching means which is of simplified construction and consists of a minimum number of parts; to provide in such a clamp or attaching means a single unitary means serving to maintain the various parts or members of the clamp in proper operative positions and to adjust the clamp members relative to each other, while also serving as a point of attachment or anchoring means for a tension element or cable; to provide such a clamp in which the clamp members cooperate to maintain the tension element or cable in place; and to provide in such a towing device a cable or tension element which is adapted without structural change for easily detachable connection at one or both ends to the clamps of the invention, or which may alternatively be used to form a running loop or noose to engage various sizes and types of objects.

The above objects and advantages are attained by the preferred embodiment of the invention illustrated in the accompanying drawings in which:

Figure 1 represents a fragmentary side elevation of the preferred embodiment of the invention, showing one end thereof attached to a structural element such as the bumper of a towing vehicle;

Figure 2, a fragmentary side elevation showing the other end thereof as applied to a structural element or bumper of a towed vehicle;

Figure 3, a plan view of one of the clamp members;

Figure 4, a detail view of the preferred form of tension element or cable adapted for use with the clamps of the invention, showing an alternative arrangement of same that may be used in lieu of one of the clamps; and, Figure 5, a cross-section on the line 5—5 of Figure 4 on an enlarged scale.

Referring now in detail to the accompanying drawings, the letter A therein designates a suitable structural element or member, such as the bumper of a vehicle to which one end of the towing device of the invention may be attached, and which for the purposes of the present description may represent the rear bumper of the towing vehicle.

Similarly, for purposes of illustration, the letter B may represent the front bumper or other suitable element of the towed vehicle.

The preferred form of towing device connecting the structural members or bumpers A and B of the respective vehicles comprises a cable or other suitable preferably flexible tension element, designated C in its entirety, and attaching elements or clamps, generally designated by the reference character D, fastened to one or both ends thereof and adapted to be fastened to said bumpers or elements A and B, as shown in Figures 1 and 2, to transmit a longitudinal pull therebetween.

The clamps or attaching elements D, which in the preferred form of the invention are identical, will accordingly have their corresponding parts designated by similar reference characters.

Each such attaching element or clamp comprises a pair of longitudinally extending transversely opposed clamp members I comprising substantially parallel longitudinally extending shank portions 2 formed with medially disposed preferably non-circular holes or perforations 3 in transverse registry with each other. Formed at the forward ends of said shank portions 2 and longitudinally aligned therewith are transversely opposed bumper gripping sections adapted to receive between them the opposed laterally extending edge portions of vehicle bumpers or structural elements A or B.

The bumper gripping sections are formed of outwardly diverging portions 4 followed by the intermediate or bumper edge engaging portions 5 adapted to engage the transversely opposed lateral edge portions of the bumpers A and B, and transversely inwardly projecting flanges or hook portions 6 carried by the portions 5 to abut against longitudinally presented surfaces or portions of the elements or bumpers A and B on sides thereof remote from the shank portions 2, to transmit longitudinal force thereto and prevent longitudinal withdrawal or dislodging of said clamps D. The outwardly projecting relatively diverging portions 4, together with the sections 5 and flanges 6 of the opposed clamp members, define transversely opposed lateral channels opening towards each other to receive the bumpers or members A and B.

In the preferred form of the invention, the clamp members I are formed from flat sheet metal stock (preferably steel) by usual sheet metal stamping and bending operations, and the shank portions 2 and gripping sections with the various component portions of the latter are all integrally connected. As shown in Figures 1 to 3, the clamp members are preferably of uniform width and thickness throughout their length, and it is convenient to form these members from flat strip stock of the same width as the clamp members, by simply cutting off a predetermined length for each member and forming it into the correct shape.

From the foregoing it will be seen that each clamping member 1 is in the form of a hook element having a straight shank portion 2 and a hook portion formed of the sections 4, 5 and 6, the two clamping elements being arranged so that the hook portions are directed inwardly or face each other. It will also be noted that the hook portion of each clamping element lies substantially entirely on one side of the plane of the shank portion so that the two flanges 6 do not overlap but are spaced apart in normal use.

Slidably transversely disposed through the holes 3 in the shank portions 2 of each clamp or attaching element D is a transverse connecting member such as the bolt 8, having relatively transversely adjustable elements such as the bolt head 9 and wing nut 10 carried thereby in engagement with the outer surfaces of the shank portions 2. Thus the clamp members 1 of each clamp may be adjusted or separated to receive automobile bumpers or other parts of varying transverse proportions and thereafter adjusted towards each other into tight engagement with the opposed edges thereof by relative transverse adjustment of the elements 9 and 10, as by rotation of the nut 10.

In order to prevent rotation of the bolt 8 with the nut 10, in the preferred embodiment of the invention, it is desirable to form the holes 3 in shank portions 2 of non-circular, preferably rectangular, cross-section, as shown in Figure 3, and to provide the bolt adjacent its head with a shoulder or integral section 11 of corresponding rectangular cross-sectional shape, to be received and held against rotation in either of said holes 3 while the wing nut 10 is rotated thereon.

In the operation of each clamp D, as the opposed gripping sections thereof are placed about the opposed edge portions of a bumper or object A or B and tightened into engagement thereon by rotation of the nut 10, it will be seen that, as shown in Figure 2, where the bumper B is of large transverse dimensions, the shank portions 2 of the clamp members will not remain in exact parallel relationship to each other, but will assume a relatively longitudinally canted or forwardly diverging relationship. However the degree thereof will be determined and limited by engagement of the longitudinally opposed edges 12 and 13 respectively of each hole 3 of the shank portions 2 with the transverse member or bolt 8 passing therethrough. Thus for all practical purposes the shank portions 2 will be maintained in parallel or approximately parallel relationship sufficiently to fulfill the operational requirements of the invention.

The preferred embodiment of tension element C consists of a usual galvanized wire rope or cable having loops or eyes 14 and 16 respectively formed at its opposite ends, preferably by means of compression fittings 15 encompassing and compressed upon the reversely bent ends and adjacent portions of said cable C, as shown in Figure 4, thus forming loops or eyes 14 and 16 of great strength. The compression fittings 15 preferably are formed of an aluminum alloy manufactured by the Aluminum Company of America and known as "61st Wrought Aluminum Alloy." The method of forming such fitting is more fully disclosed in my co-pending application, serial number 661,682, filed April 12, 1946.

Preferably the loops or eyes 14 and 16 are maintained in the desired shapes and at the desired proportions by means such as the usual rigid metal thimbles 18 shown in Figures 4 and 5. These loops are so formed and proportioned relative to each other that, when detached from their respective clamps D, one of the eyes or loops, such as 14, may be passed or threaded transversely through the other loop 16 to form a running noose or loop, as in Figure 4, adapted to extend around and engage various objects including objects or members which, due to their size or conformation cannot be engaged by said clamp members.

To this end the maximum external lateral and transverse dimensions of the eye 14 (and its cooperating fitting 15) are smaller than the maximum internal longitudinal and lateral dimensions respectively of the eye 16 thus permitting passage of the eye 14 and its cooperating fitting 15 through the eye 16.

In the operation of the towing device, which is believed to be apparent from the foregoing description, the device will normally be used with the clamps D attached to each end of the cable C, so that when it is desired to couple together two vehicles so that one may tow the other, the clamps D may be attached to the rear and front bumpers A and B respectively of the towing and towed car.

However, where the bumper of one of the vehicles is of unusual shape or proportions, or where it is desired to couple one end of the device to some object or member other than a bumper which is of such shape or proportions that it cannot successfully be engaged by one of the clamps D, both clamps D may be removed from the cable C by removal of the bolts 8 therefrom and a running loop or noose formed in said cable in the manner hereinbefore described. The loop may be formed or passed around the bumper or other object and the smaller eye 14 may be reassembled with one of the clamps D which may be attached to a bumper or other member in the manner above described.

Thus it may be seen that the towing device of the present invention may be conveniently used with and is adaptable for easy application to bumpers or objects of varying sizes and configuration.

We claim:

1. A towing device for vehicles comprising a pair of adjustably transversely spaced longitudinally extending clamp members, said clamp members being formed of sheet metal of uniform thickness throughout and comprising substantially parallel transversely spaced shank portions formed with transversely registering holes, and gripping sections formed to define transversely opposed laterally extending channels adapted to receive the opposed lateral edge portions of a vehicle bumper, in combination with a bolt slidably transversely disposed through said holes with its head in engagement with the outer surface of one of said clamp members, a nut threaded on said bolt in engagement with the outer surface of the other of said clamp members, and a tension member having a portion extending around said bolt between said shank portions, said clamp members being movably disposed relative to each other under the influence of said bolt and nut.

2. A towing device for vehicles comprising, a pair of relatively transversely spaced clamp members adapted to engage the opposed lateral edges of a vehicle bumper, and transverse inwardly projecting flanges carried by said clamp members to abut against longitudinally presented portions of said bumper, in combination with a rigid connecting member transversely disposed through holes in said clamp members and transversely movable relative to one of said clamp members, a relatively transversely adjustable element associated with said connecting element in engagement with said last mentioned clamp member, and a tension member attached to said connecting member between said clamp members, said clamp members being movably disposed relative to each other under the influence of said connecting element and said adjusting element.

3. A towing device according to claim 2 wherein the holes in said clamp members are formed as rectangular openings, and said rigid connecting member comprises a threaded bolt having a rectangular shoulder adjacent the head thereof positioned in one of said holes.

4. A towing clamp for vehicles comprising a pair of identically formed clamping elements, each clamping element comprising a hook element formed of sheet metal of uniform thickness throughout and comprising a straight shank portion and a hook portion lying substantially to one side of the plane of the shank portion, said shank portions having square holes formed therein, said hook element being arranged with the hook portions facing each other, and a clamping bolt passing through the holes formed in said shank portions and having a square shank adjacent the head thereof positioned in one of said square holes to prevent turning of said bolt, and a wing-nut threaded on the end of said bolt.

ROBERT W. WEEKS.
RUSSELL L. BLACK.

REFERENCES CITED

The following references are of record in the file of this patent:

UNITED STATES PATENTS

| Number | Name | Date |
|---|---|---|
| 994,374 | Childs | June 6, 1911 |
| 1,145,722 | Halles | July 6, 1915 |
| 1,597,383 | Mortor | Aug. 24, 1926 |
| 1,686,288 | Meals | Oct. 2, 1928 |
| 2,039,689 | Tade | May 5, 1936 |
| 2,092,593 | Seys | Sept. 7, 1937 |